Figure 1:
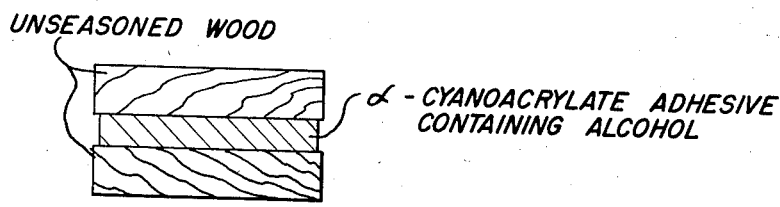

Oct. 23, 1956     H. W. COOVER, JR     2,768,109
ALCOHOL-CATALYZED α-CYANOACRYLATE ADHESIVE COMPOSITIONS
Filed June 2, 1954

HARRY W. COOVER JR
INVENTOR.
BY
ATTORNEYS

United States Patent Office 2,768,109
Patented Oct. 23, 1956

2,768,109
ALCOHOL-CATALYZED α-CYANOACRYLATE ADHESIVE COMPOSITIONS

Harry W. Coover, Jr., Kingsport, Tenn., assignor to Eastman Kodak Company, Rochester, N. Y., a corporation of New Jersey Application June 2, 1954, Serial No. 434,078

3 Claims. (Cl. 154—133)

This invention relates to the use of α-cyanoacrylate adhesive compositions, and is particularly concerned with promoting the adhesive action of such compositions.

Adhesive compositions comprising one or more monomeric esters of α-cyanoacrylic acid find excellent utility in bonding together a great variety of materials. The monomers which are employed in such adhesive compositions have the formula

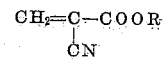

in which R is an alkyl group of 1 to 16 carbon atoms, a cyclohexyl group, or a phenyl group. These adhesive compositions can be stored in monomeric form for prolonged periods of time and then used to effect bonding of practically any materials simply by spreading a thin film of the composition onto the surface to be bonded, and allowing the adhesive composition to polymerize in situ. Such α-cyanoacrylate adhesive compositions and their use for bonding a variety of materials are disclosed in the copending application of Coover and Shearer, Serial No. 318,325, filed November 1, 1952.

The monomeric adhesives employed in practicing this invention are readily prepared by reacting a suitable α-cyanoacetate with formaldehyde in the presence of a basic condensation catalyst to give a low molecular weight α-cyanoacrylate polymer which is thereafter depolymerized by heating under reduced pressure to give the desired α-cyanoacrylate monomer. The preparation of such monomer can be carried out in aqueous medium but is preferably effected in a non-aqueous system as particularly disclosed in the copending application of Joyner and Hawkins, Serial No. 415,422, filed March 10, 1954, now Patent No. 2,721,858, granted October 25, 1955. The α-cyanoacrylate monomers are usually stabilized by incorporating therein at least about 0.001% by weight based on the weight of the monomer of a suitable acidic polymerization inhibitor. Best results are obtained when the monomeric composition contains dissolved therein a gaseous acidic inhibitor such as sulfur dioxide or nitric oxide. Ordinarily, in order to obtain rapid adhesive action without the use of heat or pressure, and without the use of a basic catalyst, it is necessary to maintain the stabilizer concentration within the range of from 0.001% to about 2% by weight during the bonding action. Even at these concentration ranges, however, the bonding action may be somewhat slower than desired. Consequently, it has been the practice to either reduce the concentration of stabilizer when the initial monomer is formed, or to remove or inactivate a portion of the stabilizer just prior to use of the composition. This latter alternative is undesirable since in many cases the adhesive composition will be used in an application where facilities are not readily available for reducing the stabilizer concentration.

Since the polymerization of α-cyanoacrylate esters is inhibited by acidic materials, it has been difficult heretofore to bond together materials which have an acidic surface characteristic. Thus, for example, green wood or wood which has not been aged sufficiently, phenolic resins, bonded plywood, and similar materials exhibit a definite acidic surface character. In some cases, the setting up of the adhesive composition has been accelerated under such conditions by either treating the surface to be bonded with a basic material or by adding a small amount of a basic catalyst to the adhesive composition just prior to application. It is difficult, however, to incorporate the basic catalyst into the adhesive composition prior to use since the catalyst cannot be introduced into the bulk of the adhesive composition unless the entire amount is to be used immediately. The treatment of acidic surfaces with basic materials such as ammonia, pyridine, quinoline, piperidine, sodium carbonate, sodium hydroxide, or the like, overcomes the inhibiting action of the acidic surface, but such treatment with base causes the bonding action to occur with such extreme rapidity that a very weak bond is formed.

It is accordingly an object of this invention to provide a method of catalyzing the adhesive action of α-cyanoacrylate adhesive compositions without destroying the adhesive effectiveness of the compositions.

Another object of the invention is to provide a method for treating the surface of materials having an acidic surface character in order to successfully overcome the inhibiting action on the adhesive compositions of this invention without weakening the adhesive bond which is formed.

Another object of this invention is to provide a simple and effective means for catalyzing the bonding action of α-cyanoacrylate adhesive compositions containing amounts of stabilizer materials sufficient to slow up the bonding action to an undesired degree.

Another object of the invention is to provide a new and highly effective class of catalytic materials for promoting the adhesive action of α-cyanoacrylate esters.

Another object of the invention is to provide a new and improved method of effecting the adhesion of acidic materials without the disadvantages which are inherent in treating such acidic surfaces with basic materials which cause the polymerization of α-cyanoacrylate esters to proceed with objectionable rapidity.

Other objects will be apparent from the description and claims which follow.

Figure 2:
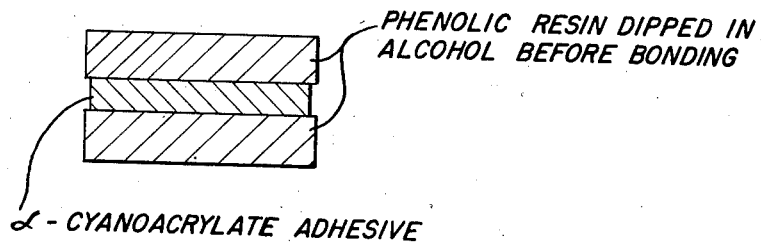

The invention is illustrated by the drawings wherein Fig. 1 shows the use of alcohol in the adhesive composition for bonding unseasoned wood and Fig. 2 shows the bonding of phenolic resins which have been dipped in alcohol.

These and other objects are attained by means of this invention which comprises catalyzing the adhesive action of an adhesive composition comprising one or more α-cyanoacrylate monomers of the formula

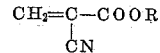

wherein R is either an alkyl group of 1 to 16 carbon atoms, a cyclohexyl group, or a phenyl group, by effecting adhesion with such adhesive composition in the presence of a catalytic amount of an alcohol of the formula R'OH, in which R' is an alkyl group of 1 to 8 carbon atoms. Although it was known heretofore that basic materials as described hereinabove catalyze the polymerization of α-cyanoacrylate monomers, it was unexpected to find that the monohydric alcohols as defined also serve to catalyze the polymerization by which bonding action is obtained without increasing the rapidity of the polymerization to such a degree that a weak bond is formed as in the case of the basic catalysts. Only small amounts of the alcohol are necessary for effecting the bonding action. The alcohol can be added to the adhesive composition if desired, but the catalytic action is preferably obtained by merely moistening the surfaces to be bonded with the alcohol and then applying the adhesive composition to this alcohol-treated surface.

In practicing the invention, it is desirable that the alcohol on the surface to be bonded be kept to a relatively small amount. For this reason, it is desirable to employ an alcohol which evaporates rather readily whereby the surface can be swabbed with the alcohol and the excess alcohol allowed to evaporate away before application of the adhesive composition. This method is highly effective for promoting the bonding action of α-cyanoacrylate esters on materials having an acidic surface character, and also for promoting the adhesive action of adhesive compositions which contain relatively large amounts of an acidic polymerization inhibitor which would otherwise slow down the adhesive action to an objectionable degree.

Any of the alcohols as defined can be used in practicing the invention, although the lower alkyl alcohols such as methyl alcohol, ethyl alcohol, isopropyl alcohol, and the like are desirably employed since they evaporate readily from the treated surface. Other alcohols containing up to 8 carbon atoms can be used with good results, however, and such alcohols as capryl alcohol, octyl alcohol, and the like are included within the scope of the invention. Typical materials which contain significant surface acidity are green wood, phenolic resins, plywood bonded with acidic resins, and similar materials. In some cases, such as in the case of green wood, the surface acidity may be sufficient to completely inhibit the polymerization of the adhesive compositions when such surfaces are not treated before the bonding is attempted. In other cases, the bonding is slowed down to a point where the bonding action takes place only after a prolonged period of time. One of the advantages of this invention is that the bonding action is relatively rapid so that the elements being bonded need not be clamped together for hours or days as is necessary with many adhesive compositions.

In the preparation of α-cyanoacrylate monomer, the monomer is usually formed by depolymerization of a low molecular weight polymer. In most cases, a stream of acidic gaseous inhibitor such as sulfur dioxide, nitric oxide, hydrogen fluoride, or the like is admixed with the monomer vapors to prevent repolymerization. When the monomers are condensed and collected, they therefore contain varying amounts of the stabilizer dissolved therein. In addition, other stabilizing materials such as phosphorous pentoxide, hydroquinone, t-butyl catechol, picric acid, or the like can be added to the monomer composition in order to also aid in the stabilization against autopolymerization in bulk. Prior to this invention, it was usually necessary to control the content of inhibitor in order that the adhesive composition would be stable in bulk but would bond rapidly when spread in a thin film on the surface being bonded. By means of this invention, the stabilizer concentration need not be maintained within strict limits since the alcohols are effective to speed up the bonding action to a considerable degree even when such stabilizer materials are present.

Usually, the lower alkyl α-cyanoacrylate esters have been employed in adhesive compositions because their bonding action is more rapid than is that of the higher esters such as capryl α-cyanoacrylate. The process of this invention is also useful in speeding up the bonding action of such higher esters. In practicing the invention, any of the α-cyanoacrylate adhesive compositions can be used including those containing a single monomer as defined herein, as well as those containing two or more of such monomers in any desired proportions. The adhesive composition can also contain a suitable ester plasticizer dissolved therein in an amount of from 1 to 20% by weight based on the total monomer weight whereby flexible high strength bonds are obtained. Suitable ester plasticizers include the alkyl esters of aliphatic monocarboxylic acids or substituted acids such as methyl cyanoacetate, ethyl cyanoacetate or the like, phthalate esters such is dioctyl phthalate, phosphate esters such as tricresyl phosphate, acyl triesters of glycerin such as glyceryl triacetate, glyceryl tributyrate, or the like, esters of dibasic acids such as dimethyl succinate, diethyl adipate, and the like, and similar plasticizing materials. The adhesive compositions can also contain materials which are effective to increase the viscosity of the compositions. Such materials include polyacrylates, polycyanoacrylates, cellulose esters, and similar polymeric materials which can be used in amounts up to 25% by weight based on the total composition weight.

The invention is illustrated by the following examples of certain preferred embodiments thereof.

Example 1

An attempt was made to bond together two pieces of unseasoned oak wood by spreading on the surfaces to be bonded a thin film of methyl cyanoacrylate monomer. The monomer remained fluid and no bonding action occurred. In this case, the surface acidity of the green wood was sufficient to completely inhibit the polymerization of the adhesive composition.

Example 2

Two pieces of green oak wood were dipped in methyl alcohol and most of the alcohol was allowed to evaporate from the surface. Thereafter a monomeric methyl α-cyanoacrylate adhesive composition was applied in a thin film to the surfaces to be bonded. The coated surfaces were then brought into contact and bonding occurred quickly to form a strong bond.

Example 3

Because of the known acidic character of unseasoned wood, it seemed logical that the bonding could be catalyzed by treating the surface of the wood with a basic material. Accordingly, two pieces of unseasoned wood were treated with ammonium hydroxide. Thereafter a methyl α-cyanoacrylate adhesive composition was applied onto the treated surfaces. A rapid bonding action occurred, and a white polymer was formed. The bond which was obtained thereby was extremely weak, however, and although the base had been effective to overcome the inhibiting action of the acidic surface, the adhesive action was reduced to a degree which made it useless.

Example 4

Plywood which is bonded with acidic resins is normally difficult to bond together with α-cyanoacrylate adhesives. In accordance with this invention, two pieces of such plywood were moistened with isopropyl alcohol, the excess alcohol allowed to evaporate, and the pieces successfully bonded with cyanoacrylate adhesive.

Example 5

As has been indicated, any of the alcohols as defined can be employed. Two pieces of phenolic resin were dipped in ethyl alcohol and the alcohol allowed to evaporate. The pieces of resin were then successfully bonded with α-cyanoacrylate adhesive to give a strong bond within a relatively short time.

Example 6

Two pieces of glass were bonded together by means of methyl α-cyanoacrylate adhesive containing 0.008% sulfur dioxide as a stabilizer. In this case 5 minutes were required for the bond to set. The same adhesive composition was used to bond two pieces of glass which had been wiped with a cloth moistened with capryl alcohol. In this case, only 5 seconds was required for the bond to set, and the bond thereby obtained had the desired tensile strength. Similar results are obtained with any of the adhesive compositions as defined herein using any of the alkyl alcohols to promote the bonding action.

Thus by means of this invention a simple but highly effective means is provided for securing high strength adhesive bonds with a great variety of materials, regardless of the acidic character of the surface being bonded. Furthermore, the bonding action of adhesive compositions containing amounts of stabilizer which ordinarily would slow the bonding action is greatly facilitated. A particular advantage of this is that the adhesive compositions can thus contain sufficient stabilizer to prevent polymerization in bulk over prolonged periods of shelf storage without the necessity of removing or inactivating any of the stabilizer prior to use, or without waiting for long periods of time for the bond to set up. Although the invention is of particular utility in bonding acidic materials or in promoting the action of adhesive compositions containing substantial amounts of stabilizer, it will be understood that the process embodying the invention can be used in bonding any materials using any of the α-cyanoacrylate adhesive compositions. Thus the invention is applicable in bonding wood, glass, metal, rubber, plastics, resins, textiles, paper, and similar materials of porous or nonporous nature.

The invention has been described in considerable detail with particular reference to certain preferred embodiments thereof, but it will be understood that variations and modifications can be effected within the spirit and scope of the invention as described hereinabove and as defined in the appended claims.

I claim:

1. The method of bonding a material exhibiting an acidic surface character which comprises moistening the surface to be bonded with an alkyl monohydric alcohol of 1–8 carbon atoms, and thereafter applying to the surface a film of adhesive composition comprising α-cyanoacrylate monomer of the formula $$CH_2=C-COOR$$
$$\quad\ \ |$$
$$\quad\ \ CN$$

wherein R is selected from the group consisting of alkyl groups of 1–16 carbon atoms, cyclohexyl groups and phenyl groups.

2. The method of strongly bonding wood having an acidic surface character which comprises moistening the surface of the wood to be bonded with an alkyl monohydric alcohol of 1–8 carbon atoms, applying an adhesive composition comprising a monomeric lower alkyl α-cyanoacrylate to the alcohol-moistened surface, and bringing the resulting coated surface into contact with the material being bonded thereto before polymerization of said adhesive composition.

3. The method of adhering together two articles of which at least one is an acidic resin which comprises moistening said article of acidic resin with an alkyl monohydric alcohol of 1–8 carbon atoms, applying a coating of an adhesive composition comprising a monomeric lower alkyl α-cyanoacrylate to the alcohol-moistened surface, and bringing the articles into bonding contact before polymerization of said adhesive composition.

References Cited in the file of this patent

UNITED STATES PATENTS

| | | |
|---|---|---|
| 2,129,722 | Woodhouse | Sept. 13, 1938 |
| 2,435,219 | Hudson | Feb. 3, 1948 |
| 2,467,927 | Ardis | Apr. 19, 1949 |
| 2,500,783 | Anderson et al. | Mar. 14, 1950 |
| 2,548,169 | Miller | Apr. 10, 1951 |
| 2,615,879 | Folt et al. | Oct. 28, 1952 |

FOREIGN PATENTS

| | | |
|---|---|---|
| 312,697 | Great Britain | May 31, 1929 |